United States Patent
Senno

(10) Patent No.: US 8,446,266 B2
(45) Date of Patent: May 21, 2013

(54) ANTITHEFT SYSTEM AND METHOD THEREOF

(75) Inventor: Masaharu Senno, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 716 days.

(21) Appl. No.: 12/725,710

(22) Filed: Mar. 17, 2010

(65) Prior Publication Data

US 2011/0032092 A1 Feb. 10, 2011

(30) Foreign Application Priority Data

Aug. 7, 2009 (JP) .................................. 2009-184600

(51) Int. Cl.
*B60R 25/10* (2006.01)

(52) U.S. Cl.
USPC ........................................ 340/426.1; 340/427

(58) Field of Classification Search
USPC .............................................. 340/426.1, 427
See application file for complete search history.

(56) References Cited

U.S. PATENT DOCUMENTS

| | | | | |
|---|---|---|---|---|
| 4,196,429 A * | 4/1980 | Davis | ............................ | 340/669 |
| 4,322,714 A * | 3/1982 | Morgan | ........................ | 340/427 |
| 4,641,124 A * | 2/1987 | Davis | ....................... | 340/426.23 |
| 5,534,847 A * | 7/1996 | McGregor | .................... | 340/432 |
| 6,246,934 B1 * | 6/2001 | Otake et al. | ................... | 701/32.2 |
| 6,941,206 B2 * | 9/2005 | Hasegawa et al. | ............... | 701/38 |
| 7,034,665 B2 * | 4/2006 | Kojika et al. | .................. | 340/427 |
| 7,124,852 B2 * | 10/2006 | Hasegawa | ..................... | 180/282 |
| 7,495,549 B2 * | 2/2009 | Acres | ............................ | 340/427 |
| 2010/0198453 A1 * | 8/2010 | Dorogusker et al. | ........... | 701/33 |

FOREIGN PATENT DOCUMENTS

JP 3622723 B2 2/2005

\* cited by examiner

*Primary Examiner* — Jennifer Mehmood
*Assistant Examiner* — Rufus Point
(74) *Attorney, Agent, or Firm* — Westerman, Hattori, Daniels & Adrian, LLP

(57) ABSTRACT

An antitheft system and method capable of being more easily mounted than was conventionally done, with a detecting capability, necessary and sufficient to determine the occurrence of a theft. An RSS value r is calculated as a square-root of sum of squares by putting together each of variations in X-, Y- and Z-axes in a sensor unit 38. Then, a moving average value av obtained by averaging a predetermined number of consecutive RSS values r taken in chronological order is utilized to determine whether a theft is in process or not. Hence, even if an X-axis detector 41, a Y-axis detector 42 and a Z-axis detector 43 are not matched to longitudinal, lateral and vertical directions FR, LR and UD of a two-wheeled motor vehicle, it is possible to determine whether a theft is in process or not. Thus, the antitheft system 1 can be mounted in a desired position without taking into account a detection direction of the sensor unit 38 in relation to the two-wheeled motor vehicles 3a, 3b, thereby providing the antitheft system 1 capable of being more easily mounted than was conventionally done with a detecting capability, necessary and sufficient to determine the occurrence of a theft.

10 Claims, 5 Drawing Sheets

ANTITHEFT SYSTEM AND METHOD THEREOF

BACKGROUND OF THE INVENTION

1. Field of the Invention

The present invention relates to an antitheft system and a method thereof, which are preferably applicable to an antitheft system used for, e.g., a two-wheeled motor vehicle.

2. Description of the Related Art

Heretofore, as an antitheft system used for a two-wheeled motor vehicle, a vehicle antitheft system has been known in which the system is provided with an acceleration detecting means for detecting accelerations in a plurality of directions of a two-wheeled motor vehicle and a determination means for determining the presence and absence of abnormality associated with the theft of a vehicle based on the accelerations detected by the acceleration detecting means, as disclosed in e.g., a publication of Japanese patent No. 3622723. This vehicle antitheft system is capable of detecting a plurality of conditions of the two-wheeled motor vehicle based on an output from one acceleration detecting means to provide a high antitheft function while realizing the downsizing of the whole system as well as the reduction of cost.

According to the vehicle antitheft system thus structured, however, there has been a problem that it is not able to be easily installed, because, in order to ensure a sufficient detecting capability required for determining the presence of a theft, the system needs to be installed so that two axial directions of the acceleration detecting means may be precisely consistent with two axial directions indicating the front-to-back and the right-to-left directions of the two-wheeled motor vehicle, in the case of employing an acceleration detecting means for detecting accelerations in orthogonal two-axial directions, for example.

SUMMARY OF THE INVENTION

In view of the problem described above, it is, therefore, an object of the present invention to provide an antitheft system which can be more easily installed than was conventionally done, with a detecting capability necessary and sufficient to determine the presence of a theft. It is another object of the present invention to provide an antitheft method having such advantageous feature.

To solve this problem in the present invention, there is provided an antitheft system according to a first aspect of the present invention, including a sensor unit provided in a two-wheeled motor vehicle to detect variations of accelerations in a plurality of directions; a calculator for sequentially calculating a square-root of sum of squares of said variations of accelerations in a plurality of said directions in said sensor unit and then calculating a moving average thereof by calculating a sum of a predetermined number of the square-roots of sum of squares of said variations of accelerations obtained in chronological order, and then dividing the sum by the predetermined number; and a determination unit for determining whether or not an antitheft means should be allowed to operate based on said moving average and a threshold set in advance on the basis of conditions assumed to indicate the occurrence of a theft of said two-wheeled motor vehicle.

A second aspect of the present invention is characterized in that the sensor unit detects the variations of the accelerations in a plurality of the directions at preset time intervals.

A third aspect of the present invention is characterized in that the two-wheeled motor vehicle is equipped with any one of a side-stand and a center-stand and the determination unit is allowed to recognize an angle variation or vibrations of the two-wheeled motor vehicle, which are generated in the event of a theft based on the threshold.

A fourth aspect of the present invention is characterized in that the number of the square-roots of sum of squares used in calculating the moving average value and the threshold are set individually for the angle variation of the two-wheeled motor vehicle and the vibrations thereof.

A fifth aspect of the present invention is characterized in that the antitheft system further includes a settings changing unit capable of changing any one of the number of the square-roots of sum of squares used in calculating the moving average value and the threshold.

A sixth aspect of the present invention is characterized in that an antitheft method includes a detecting step for detecting variations of accelerations in a plurality of directions by means of a sensor unit provided in a two-wheeled motor vehicle; a calculating step for sequentially calculating a square-root of sum of squares of said variations of accelerations in a plurality of said directions in said sensor unit and then calculating a moving average thereof by calculating a sum of a predetermined number of the square-roots of sum of squares of said variations of accelerations obtained in chronological order, and then dividing the sum by the predetermined number; and a determination step for determining whether or not an antitheft means should be allowed to operate based on said moving average and a threshold set in advance on the basis of conditions assumed to indicate the occurrence of a theft of said two-wheeled motor vehicle.

A seventh aspect of the present invention is characterized in that the detection step detects the variations of accelerations in a plurality of the directions at preset time intervals.

A eighth aspect of the present invention is characterized in that the antitheft method is used for a two-wheeled motor vehicle equipped with any one of a side-stand and a center-stand and includes a recognition step for recognizing an angle variation or vibrations of the two-wheeled motor vehicle, which are generated in the event of a theft based on the threshold.

A ninth aspect of the present invention is characterized in that the number of the square-roots of sum of squares used in calculating the moving average value and the threshold are set individually for the angle variation of said two-wheeled motor vehicle and the vibrations thereof.

A tenth aspect of the present invention is characterized in that the antitheft method includes a settings changing step for changing any one of the number of the square-roots of sum of squares used in calculating the moving average value and the threshold by means of a settings changing unit.

According to the first and sixth aspects of the present invention, the moving average value obtained by merging the accelerations in a plurality of the directions in the sensor is used and thus even if the sensor unit is out of alignment from the front-back, the right-left and vertical directions of the two-wheeled motor vehicle, the theft of the two-wheeled motor vehicle can be determined. Hence, the sensor unit can be mounted in a desired position of the two-wheeled motor vehicle, permitting an antitheft system more easily mountable than was conventionally to be provided while ensuring a detecting capability necessary and sufficient to determine the theft.

According to the second and seventh aspects of the present invention, the variations of the accelerations in a plurality of the directions are not detected full-time in the sensor unit. Hence, power consumption can be reduced by just that much.

According to the third and eighth aspects of the present invention, theft can be determined based on the angle variation and the vibrations which are generated in the two-wheeled motor vehicle equipped with at least any one of the side-stand and the center-stand.

According to the fourth and ninth aspects of the present invention, the determination of whether or not the antitheft means should be allowed to operate is practiced separately for the angle variation and the vibrations which are generated in the event of the theft.

According to the fifth and tenth aspects of the present invention, with reference to each condition assumed in the event of theft of the two-wheeled motor vehicle, the number of the measurement value used for calculating the moving average value and/or the threshold can be regulated.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Hereunder is a detailed description of one preferred embodiment of the present invention with reference to the accompanying drawings.

Figure 1:
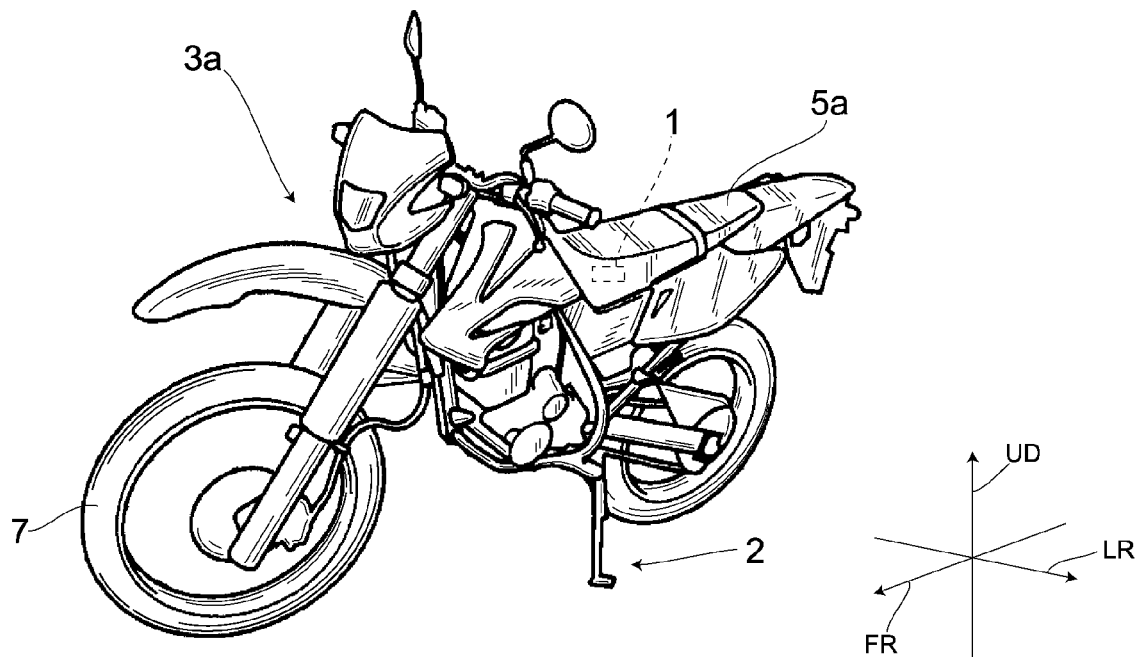
FIG. 1 is a schematic view illustrating an overall structure of a two-wheeled vehicle equipped with a side-stand.
Figure 2:
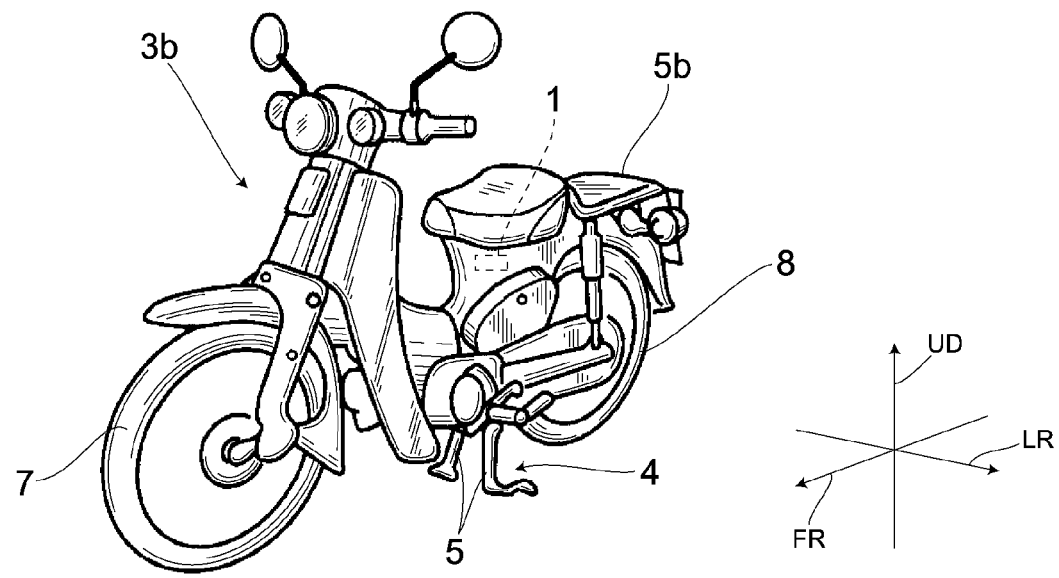
FIG. 2 is a schematic view illustrating an overall structure of a two-wheeled vehicle equipped with a center-stand.

(1) A Two-Wheeled Motor Vehicle Mounted with the Antitheft System According to the Present Invention In FIG. 1 and FIG. 2, numeral symbol 1 denotes the antitheft system according to the present invention. FIG. 1 shows the antitheft system 1 mounted on a two-wheeled motor vehicle 3a using a side-stand 2, while FIG. 2, where the same numeral symbols are labeled to portions corresponding to those in FIG. 1, shows the antitheft system 1 mounted on a two-wheeled motor vehicle 3b using a center-stand 4. Here, firstly, it is simply described what circumstances will arise in the two-wheeled motor vehicles 3a, 3b when the two-wheeled motor vehicles 3a, 3b each mounted with the antitheft system 1 are stolen during parking.

(1-1) In the Case of the Two-Wheeled Motor Vehicle Using a Side-Stand

As shown in FIG. 1, the two-wheeled motor vehicle 3a is provided with a substantially L-shaped side-stand 2 on the lower side of one lateral side portion of a vehicle body 5a.

Specifically, a proximal portion of this side-stand 2 is pivotably attached to the lower portion of the one lateral side portion of the vehicle body 5a so that the side-stand 2 can be allowed to extend in a nearly upright posture relative to the ground with its longitudinal portion extending toward the bottom of the vehicle body 5a (hereunder referred to as a side-stand upright condition) and also can be allowed to extend in a nearly horizontal posture relative to the ground with its longitudinal portion arranged along a front-to-rear (i.e., longitudinal) direction FR of the vehicle body 5a (hereunder referred to as a side-stand retracted condition).

When parking the two-wheeled motor vehicle 3a, the side-stand 2 is allowed to make the transition to the side-stand upright condition, and a distal end thereof is then allowed to come in contact with the ground, thereby enabling the vehicle body 5a to be supported with the vehicle body 5a tilted at a given angle toward its one side provided with the side-stand 2 with respect to the left-to-right/right-to-left (i.e., lateral) direction LR of the vehicle body 5a (hereunder, this condition is referred to as a side-stand in-operation condition). In addition, in the two-wheeled motor vehicle 3a, the side-stand 2 in the side-stand upright condition is allowed to pivot about its proximal portion toward the rearward of the vehicle body and thus makes the transition to the side-stand retracted condition so that the vehicle body can be easily moved without the distal end of the side-stand 2 coming in contact with the ground.

Figure 3:
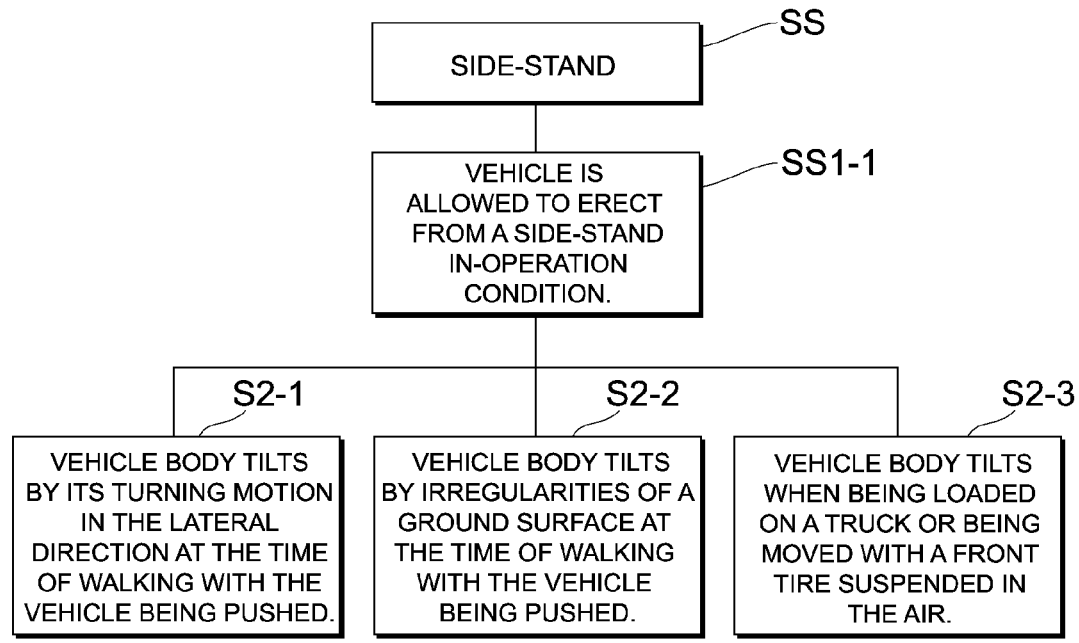
FIG. 3 is a general flowchart of a side-stand in respective conditions.

According to the two-wheeled motor vehicle 3a using the above-structured side-stand 2, when a theft occurs during parking, the posture of the vehicle can be varied in general according to possible flows indicated in a side-stand flow SS shown in FIG. 3. Specifically, as shown in the side-stand flow SS, the two-wheeled motor vehicle 3a will, at first, have its vehicle body 5a allowed to stand upright by a third person from the side-stand in-operation condition in which the vehicle body is tilted (step SS1-1).

Next, the vehicle body 5a of the two-wheeled motor vehicle 3a is pushed with this condition retained by the third person while being tilted and turned in the lateral direction LR during a waking motion of the third person pushing the vehicle body 5a (step S2-1) until it is carried to a given place. At this moment, the vehicle body 5a of the two-wheeled motor vehicle 3a may be tilted at times by inequalities of the ground surface during the walking motion of the third person pushing the vehicle body 5a (step S2-2). Furthermore, when the two-wheeled motor vehicle 3a is loaded on a truck bed or the like or it is hauled with a front tire 7 suspended, the vehicle body 5a gets tilted with respect to the front-to-rear direction FR, the up-and-down direction UD, etc. (step S2-3).

Then, according to the antitheft system 1 of the present invention, a hereinbelow-described threshold is set in advance in the two-wheeled motor vehicle 3a equipped with the side-stand 2, based on the tendency of an angle variation of the vehicle body 5a in each condition of the side-stand flow SS, to thereby determine whether or not each condition of the side-stand flow SS has been realized on the basis of the threshold. Thus, the occurrence of theft of the two-wheeled motor vehicle 3a is estimated.

(1-2) In the Case of the Two-Wheeled Motor Vehicle Using a Center-Stand

Next is a description of the two-wheeled motor vehicle 3b using the center-stand 4. As shown in FIG. 2, in a lower portion of the center of the vehicle body 5b, the two-wheeled motor vehicle 3b is provided with the center-stand 4 which is Π-shaped and is formed with a wider spacing between its distal ends of opposed legs 5 than between its proximal portions.

Specifically, an intermediate portion (not shown) between the legs 5 of the center-stand 4 is pivotably attached to a bottom portion of a substantially central portion of the vehicle body 5b. Accordingly, the center-stand 4 can be allowed to extend in a nearly upright posture relative to the ground with the longitudinal portion of the leg 5 extending toward the bottom side of the vehicle body 5b (hereunder, this condition is referred to as a center-stand upright condition) and also can be allowed to extend in a nearly horizontal posture relative to the ground with its longitudinal portion arranged along a front-to-rear direction FR of the vehicle body 5b (hereunder, referred to as a center-stand retracted condition).

When parking the two-wheeled motor vehicle 5b, the distal end of each leg 5 of the center-stand 4 is allowed to come in contact with the ground to get into the center-stand upright condition, and thus a rear tire is suspended by means of each of the legs 5, thus enabling the vehicle body 5b to be supported with the vehicle body 5b nearly erected (hereunder, this condition is referred to as a center-stand in-operation condition). According to the two-wheeled motor vehicle 3b, the center-stand 4 in the center-stand upright condition can be rotated about the intermediate portion thereof toward the rearward of the vehicle body 5b, thus getting into the center-stand retracted condition for the rear tire 8 to come in contact with the ground so that the vehicle can be easily moved without the distal ends of the center-stand 4 coming in contact with the ground.

Figure 4:
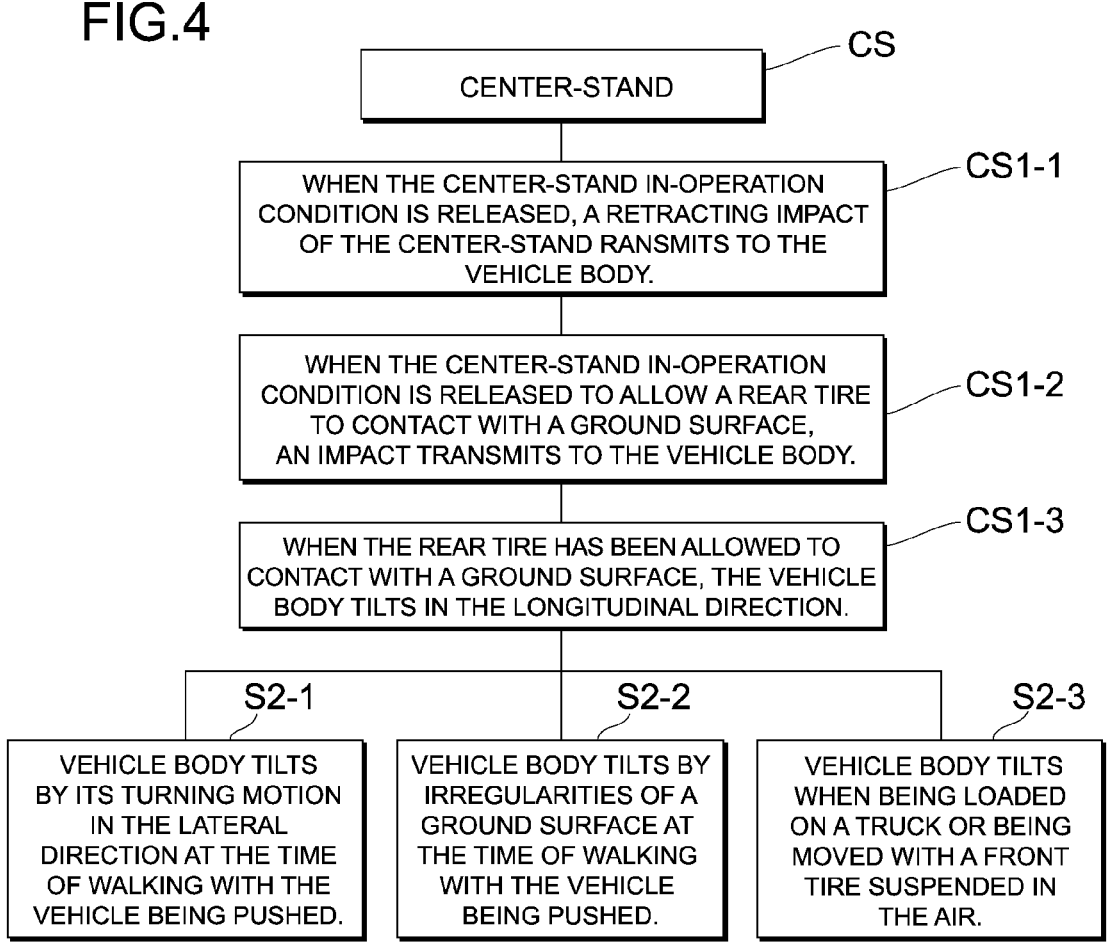
FIG. 4 a general flowchart of a center-stand in respective conditions.

According to the two-wheeled motor vehicle 3b using the foregoing center-stand 4, when a theft occurs during parking, the posture of the vehicle can be varied in general according to possible flows indicated in a center-stand flow CS shown in FIG. 4. Specifically, as shown in the center-stand flow CS, the two-wheeled motor vehicle 3b will, at first, have the center-stand 4 in the center-stand in-operation condition rotated backward by a third person to thereby be released from the center-stand in-operation condition, and then make the transition to the center-stand retracted condition. At this time, the center-stand 4 strikes the underneath of the vehicle body 5b and as a result, an impact generated by the transition to the retracted condition is transmitted to the vehicle body 5b, vibrating the vehicle body 5b (step CS-1-1).

Also, at this time, in the two-wheeled motor vehicle 3b, the rear tire 8 suspended in the air due to the vehicle body 5b supported by means of the center-stand 4 strikes the ground as a result of the transition to the center-stand retracted condition and then an impact generated at that time is also transmitted to the vehicle body 5a to vibrate the vehicle body 5a (step CS1-2). Further, in the two-wheeled motor vehicle 3b, when making the shift to the center-stand retracted condition, the rear tire suspended in the air comes in contact with the ground and hence the vehicle body 5b is tilted with respect to the longitudinal direction FR (step CS1-3).

Next, as is the case with the two-wheeled motor vehicle 3a using the above side-stand 2, the vehicle body 5b is pushed with this condition retained by a third person while being tilted and turned in the lateral direction LR during a walking motion of the third person pushing the vehicle body 3b (step CS2-1) until it is carried up to a given place. At this moment, the vehicle body 5b of the two-wheeled motor vehicle 3b may be tilted at times by inequalities of the ground surface (step S2-2). Furthermore, when the two-wheeled motor vehicle 3b is loaded on a truck bed etc. or it is hauled with a front tire 7 suspended, the vehicle body 5b gets tilted with respect to the longitudinal direction FR, the vertical direction UD, etc. (step S2-3).

Then, according to the antitheft system 1 of the present invention, a hereinbelow-described threshold is set in advance in the two-wheeled motor vehicle 3b equipped with the center-stand 4, based on the tendency of an angle variation of the vehicle body 5b in each of the conditions of steps CS1-1, CS1-2, S2-1 to S2-2 in the center-stand flow CS as well as the tendency of vibrations of the vehicle body 5b in the condition of the step CS1-3 in the center-stand flow CS, to thereby determine whether or not each of the conditions of the center flow CS has been realized on the basis of the threshold, thus estimating a theft of the two-wheeled motor vehicle 3b.

(2) Description of the Antitheft System

Figure 5:
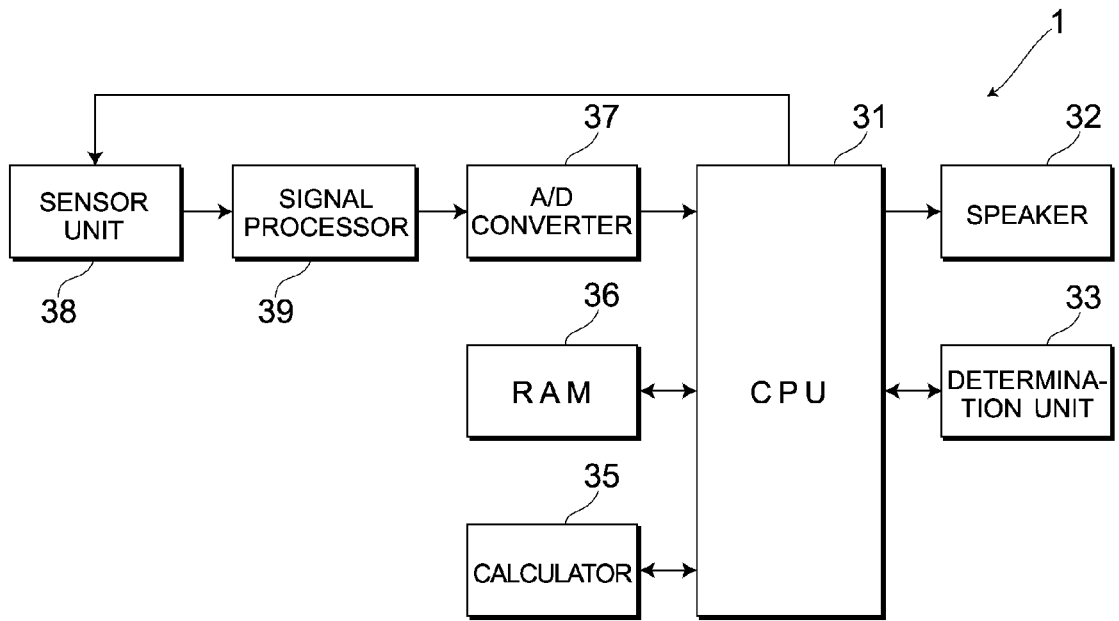
FIG. 5 is a block diagram illustrating a circuit configuration of an antitheft system.

Hereunder is a description of a structure of the antitheft system 1 according to the present invention. As shown in FIG. 5, the antitheft system 1 is configured such that to a CPU (Central Processing Unit) for comprehensively controlling the antitheft system 1 is connected a speaker 32, a determination unit 33, an operational unit 34, a calculator 35, a RAM (Random Access Memory) 36, an A/D converter 37 and a sensor unit 38, and this sensor unit 38 is connected with the A/D converter 37 via a signal processor 39. In addition, the antitheft system 1 has a system configuration with a specification in which, e.g., an output voltage and a reference voltage are each 3V, the sensor unit 38 output voltage is 500 mV, a sampling frequency is 100 Hz, the A/D converter 37 digitally converts 0.00586 mG to 1 ADC at 10 quantization bit rate, and the signal processor 39 is equipped with a low-pass filter having a 1 KHz cutoff frequency.

(2-1) Data Recording Process

Figure 6:
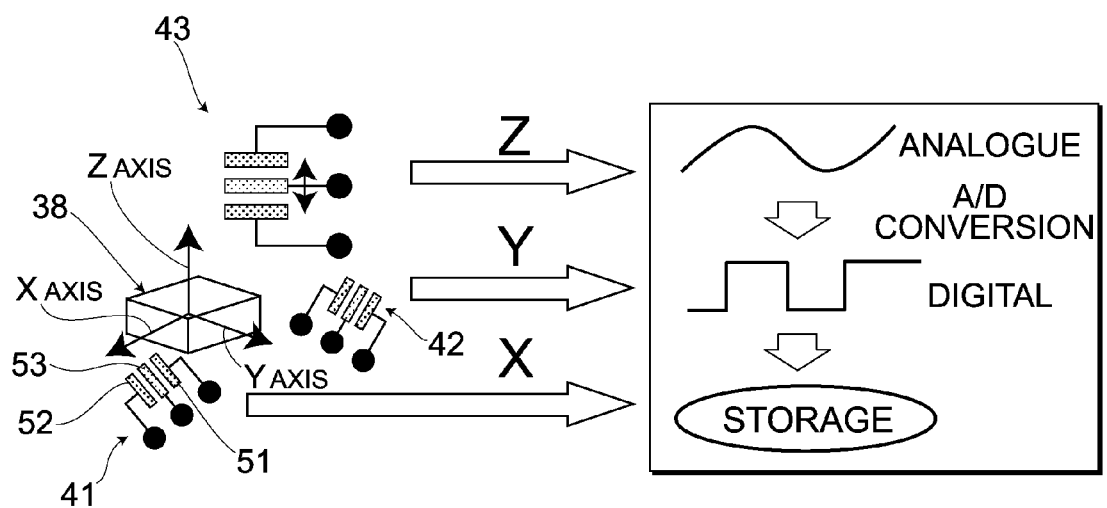
FIG. 6 is a schematic view illustrating the configuration of a sensor unit.

As shown in FIG. 6, the sensor unit 38 can detect each of accelerations in triaxial directions of an X axis, a Y axis and a Z axis which are orthogonal to one another. In this embodiment, the sensor unit 38 includes, e.g., an X-axis detector 41 for detecting an X-axial acceleration, a Y-axis detector 42 for detecting a Y-axial acceleration and a Z-axis detector 43 for detecting a Z-axial acceleration. These X, Y, Z axes detectors 41, 42, 43 are arranged so as to be able to detect each axial acceleration based on a detection command from the CPU 31 when an electric source of the antitheft system 1 has been turned on during the parking of the two-wheeled motor vehicles 3a, 3b.

Here, as the X-axis detector 41, the Y-axis detector 42 and the Z-axis detector are structured in the same way, a simple description is given of the makeup of the X-axial detector. In this case, the X-axis detector 41 is arranged with a movable plate 53 between two fixed plates 51, 52, and an inertial force applied to the X-axial direction can vibrate the movable plate 53 between the fixed plates 51, 52. According to the X-axis detector 41, when an electric source of the antitheft system 1 has been turned on during the parking of the two-wheeled motor vehicles 3a, 3b, the X-axis detector 41 can be set up, with a position, where the movable plate 53 remains stationary between the fixed plates 51, 52 during the parking, defined as a reference position under a preset condition, taking a temperature drift (a phenomenon in which an output value is varied in response to an ambient temperature change), etc. into consideration.

According to the X-axis detector 41, when each of the two-wheeled motor vehicles 3a, 3b in their parked conditions has been moved by a third person, a gap between the movable plate 53 and the fixed plates 51, 52 changes in response to the movement, thereby permitting a change in electrostatic capacity between the movable plate 53 and the fixed plates 51, 52 to be detected as a change in voltage.

According to the antitheft system 1, therefore, by performing a data recording process, it is possible to detect a voltage change deviated from the reference voltage in each of the X-, Y- and Z-axes detectors 41, 42, 43 to obtain the voltage change in the form of an analogue signal and convert the analogue signal into a digital signal (A/D conversion) to be able to store the digital signal thus obtained in the RAM 36. Specifically, according to this embodiment, as shown in FIG. 5, based on sampling information supplied from the CPU 31, the sensor unit 38 intermittently detects, e.g., the voltage change of the X axis detector 41 at a given sampling frequency (100 Hz) to produce an X axis analogue detection signal, sending out the X axis analogue detection signal to the signal processor 39.

After having applied, to the X axis analogue detection signal received from the X axis detector 41, given signal processes such as a signal amplifying process, a filtering process by means of the low-pass filter and a correction process and the like, the signal processor 39 sends out the processed signal to the A/D converter 37 as an X axis acceleration signal. The A/D converter 37 quantizes (at 10 bits) the X axis acceleration signal to produce an X-axis variation $\Delta X$ digitally converted, permitting $\Delta X$ to be stored in the RAM 36 as X axis data XD.

Similarly, also in the Y-axis detector 42 and the Z-axis detector 43, when the electric source has been turned on under a preset condition in consideration of a temperature drift or the like during the parking of the two-wheeled motor vehicles 3a, 3b, the sensor unit 38 can set each of reference values of the Y-axis detector 42 and Z-axis detector 43 at "0" on the basis of the parking conditions of the two-wheeled motor vehicles 3a, 3b.

By performing a data recording process, the sensor unit 38 intermittently detects a voltage change of each of the Y-axis detector 42 and Z-axis detector 43 at a given sampling frequency (100 Hz) to produce Y-axis and Z-axis analogue detection signals, sending out these signals to the A/D converter 37 via the signal processor 39.

The A/D converter 37 quantizes a Y-axis acceleration signal (at 10 bits) to produce a Y-axis variation $\Delta Y$, permitting $\Delta Y$ to be stored in the RAM 36 as Y-axis data YD. Likewise, the A/D converter 37 quantizes a Z-axis acceleration signal (at 10 bits) to produce a Z-axis variation $\Delta Z$, permitting $\Delta Z$ to be stored in the RAM 36 as Z-axis data ZD.

Besides, in addition to the system like this, by performing a determination process as well as the data recording process described above during the parking of the two-wheeled motor vehicles 3a, 3b, the antitheft system 1 calculates a moving average value (described below) obtained by merging the X-axis data XD, the Y-axis data YD and the Z-axis data ZD and thus can determine, based on the moving average value, whether or not the parked two-wheeled motor vehicles 3a, 3b have been moved by a third person.

(2-2) Determination Process

Figure 7:
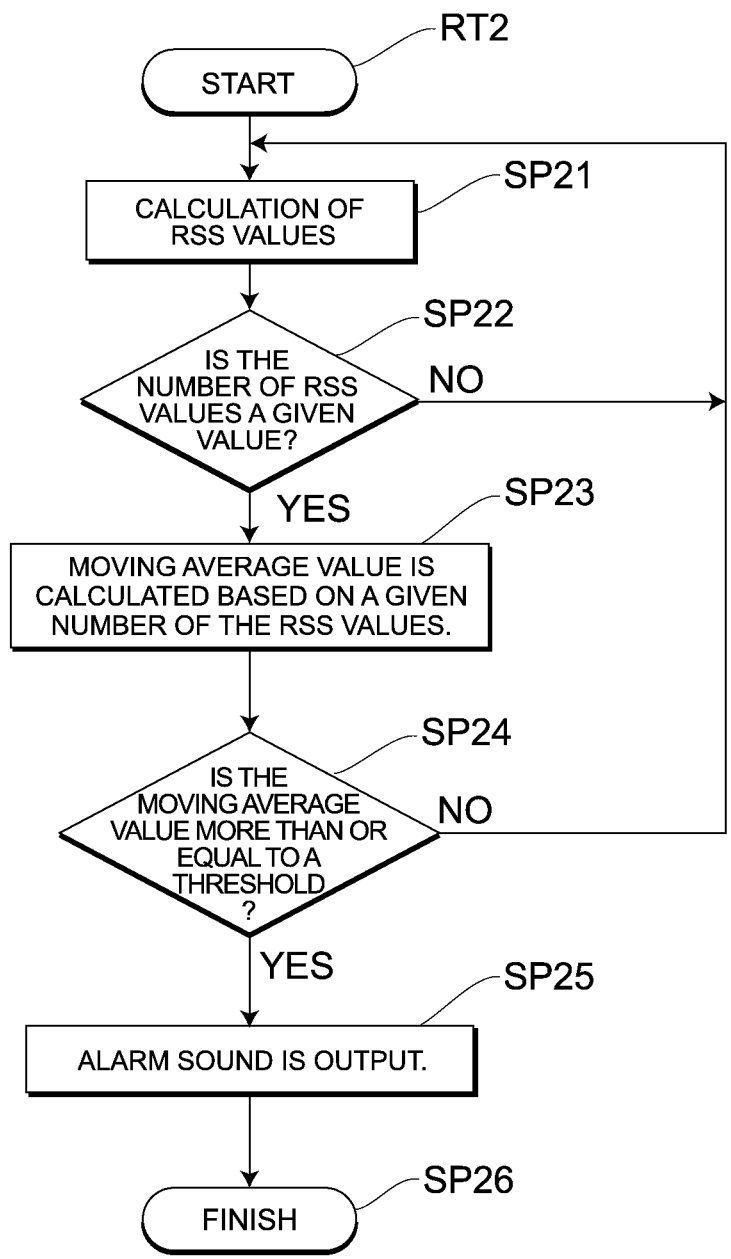
FIG. 7 is a flow chart illustrating a procedure for a determination process.

Next, a description of one example of the determination process is given by using a circuit diagram of the antitheft system 1 shown in FIG. 5 and a flowchart shown in FIG. 7. When the electric source has been turned on during the parking of the two-wheeled motor vehicles 3a, 3b, the CPU 31 enters a routine RT2 from its starting step to begin the determination process and then transfers to a step SP21. In the step SP21, the CPU 31 instructs the calculator 35 to calculate an RSS (Root Sum Square) value r based on the X-axis data XD, the Y-axis data YD and the Z-axis data ZD. Specifically, the CPU 31 reads out the X-axis variation $\Delta X$, the Y-axis variation $\Delta Y$ and the Z-axis variation $\Delta Z$ which have been produced at the same timing. Then, as shown in a formula 1, the CPU 31 instructs the calculator 35 to calculate the RSS value r produced by applying these X-axis variation $\Delta X$, Y-axis variation $\Delta Y$ and Z-axis variation $\Delta Z$ to square-root of sum of squares to merge these variations (in the formula, the X-axis variation $\Delta X$, the Y-axis variation $\Delta Y$ and the Z-axis variation $\Delta Z$ are abbreviated only as $\Delta X$, $\Delta Y$ and $\Delta Z$).

$$\sqrt{\Delta X^2 + \Delta Y^2 + \Delta Z^2} \qquad \text{Formula 1}$$

Next, in a step SP22, the CPU 31 determines whether or not a predetermined number (e.g., 5) of the RSS values r have been calculated. If "YES" is suited here, this means that a predetermined time has elapsed from the start of the determination process to show the fact that a predetermined number of consecutive RSS values r had been calculated. Hence, the CPU 31 makes the transition to the next step SP23 and calculates the moving average value av described below.

In a step SP23, when "5",e.g., is set in advance as the predetermined number, the CPU 31 reads out the calculated consecutive last five RSS values r which contains the last RSS value calculated (hereunder, referred to as the last RSS value). Then, the CPU 31 calculates the moving average value av by dividing a total sum value, produced by adding all the five RSS values, by the predetermined number "5". Thus, the CPU can calculate the moving average value av produced by averaging the predetermined number of the RSS values r composed of the last RSS value and a plurality of the previously calculated RSS values which were temporally consecutive from the last RSS value.

Figure 8:
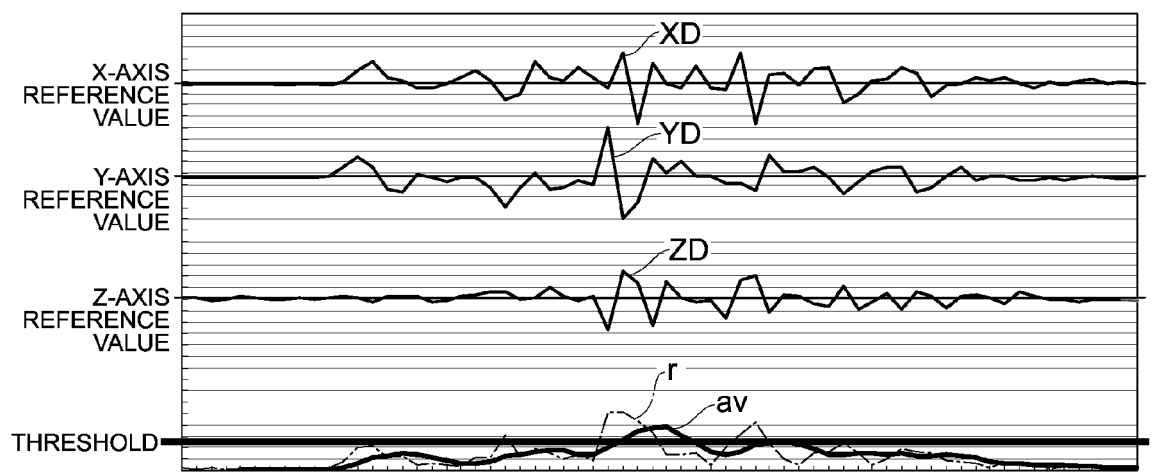
FIG. 8 is a timing chart illustrating a relationship among X axis data, Y axis data, Z axis data, an RSS value, a moving average value and a threshold.

Here, FIG. 8 is a graph showing the relationship among the X-axis data XD, the Y-axis data YD and the Z-axis data ZD which have been produced by quantizing (10 bits) the X-axis, Y-axis and Z-axis acceleration signals obtained by being allowed to pass through the low-pass filter of a 1 kHz cut-off frequency in the signal processor 39 to be sampled at 100 Hz, and the RSS value r and the moving average value av which have been calculated from these data.

In the step SP24, the CPU 31 instructs the determination unit 33 to determine whether or not the moving average value av calculated in the step SP23 is more than or equal to a given threshold preset in the determination unit 33 (the moving average value av is equal to or more than the threshold). The threshold set here in the determination unit 33 is set with reference to each condition in the side-stand flow chart SS and in the center-stand flow chart CS and each of the conditions of the side-stand flow chart SS and center-stand flow chart CS is set as a detectable numerical value based on the moving average value av.

Specifically, when "YES" has resulted in a step SP24, it is indicated that the moving average value av is more than or equal to the threshold, in other words, the two-wheeled motor vehicles 3a, 3b are in the conditions of the side-stand flow SS or center-stand flow CS and then the CPU 31 makes the transition to a step SP 25. In the step SP 25, the CPU 31 outputs an alarm sound from the speaker 32 to transfer to the next step SP 26, thus terminating the determination process described above. On the other hand, when "No" has resulted in the step SP4, it is indicated that the moving average value av is not more than the threshold, in other words, the two-wheeled motor vehicles 3a, 3b are not in the conditions of the side-stand flow SS or center-stand flow CS and then the CPU 31 makes the transition again to the step SP21, then repeating the above process.

The CPU 31 repeats the step SP21 to the step SP24 until "YES" results in the step SP24 and thus issues instructions to calculate a new RSS value r until the moving average value av becomes more than or equal to the threshold. Thus, the CPU 31 can calculate the moving average value av obtained by averaging a predetermined number of the RSS values r composed of the last RSS value r and a plurality of the previously calculated RSS values r which are temporally consecutive from the last RSS value.

(3) Behavior and Effects

In the system described above, when the electric source has been turned on, the antitheft system 1 performs the data recording process when the electric source is turned on under the preset condition in consideration of a temperature drift during the parking of the two-wheeled motor vehicle 3a, 3b and then sets, as "0", each of the reference values of the X-axis detector 41, the Y-axis detector 42 and the Z-axis detector 43, which are in the sensor unit 38. Then, the antitheft system 1 expresses the angle variations and vibrations of the two-wheeled motor vehicles 3a, 3b by the variations from each of the reference values and further produces intermittently the X-axis variation $\Delta X$, the Y-axis variation $\Delta Y$ and the Z-axis variation $\Delta Z$ at a given interval.

Further, the antitheft system 1 practices the determination process as well as the data recording process to calculate the RSS value r expressed by a root sum square produced by emerging the X-axis variation $\Delta X$, the Y-axis variation $\Delta Y$ and the Z-axis variation $\Delta Z$ which have been produced at the same timing. Then, when the calculated number of the RSS values has reached the preset predetermined number, the antitheft system 1 calculates the moving average value av indicating the average value of these RSS values r, from the predetermined number of the RSS values r composed of a plurality of the previously calculated consecutive RSS values r containing the last RSS value r The antitheft system 1 determines whether or not the moving average value av is more than or equal to the preset threshold value in the determination unit 33. When the moving average value av is more than or equal to the threshold value, the antitheft system 1 estimates the two-wheeled motor vehicle 3a, 3b to be in the side-stand flow SS condition and the center-stand flow CS condition. Then, the antitheft system 1 outputs an alarm sound to perform alarm, thus enabling a third person to be menaced by the alarm sound.

As described above, the antitheft system 1 calculates the RSS value r produced by merging each of the variations in the X-axial, the Y-axial and the Z-axial based on the detected results of the X-axis detector 41, the Y-axis detector 42 and the Z-axis detector 43 which are present in the sensor unit 38 and then determines a theft based on the moving average value av calculated from the a predetermined number of the consecutive RSS values r. Hence, even if the X-axis detector 41, the Y-axis detector 42 and the Z-axis detector 43, which are present in the sensor unit 38, are allowed not to be matched exactly to the longitudinal direction FR, the lateral direction LR and the vertical direction UD of each of the two-wheeled motor vehicles 3a, 3b, a theft of each of the two-wheeled motor vehicles 3a, 3b can be determined.

Accordingly, in the antitheft system 1, the trouble can be saved for having to match the X-axis detector 41, the Y-axis detector 42 and the Z-axis detector 43, which are present in the sensor unit 38 exactly to the longitudinal direction FR, the lateral direction LR and vertical direction UD of each of the two-wheeled motor vehicles 3a, 3b. Thus, the antitheft system 1 can be more easily mounted than was conventionally done with its detection capability, necessary and sufficient to determine the occurrence of the theft, ensured.

Further, the antitheft system 1 intermittently detects the variations of the acceleration of the X-axis, Y-axis, Z-axes in the sensor unit 38 at a given sampling frequency to calculate the RSS value r from the X-axis, Y-axis, Z-axis variations $\Delta X$, $\Delta Y$, $\Delta Z$ obtained by quantizing the X-axis, Y-axis, Z axis-detection signals obtained by the above detection. Hence, the electric power consumption can be reduced as compared to full-time detecting the X-axis, Y-axis, Z-axis detection signals in the sensor unit 38.

According to the system described above, the RSS value (a measurement value) produced by merging the accelerations, in a plurality of directions, output from the sensor unit 38 is sequentially calculated by the calculator 35 and based on the threshold preset on the basis of the conditions assumed in the event of a theft in each of the two-wheeled motor vehicles 3a, 3b and the moving average value av indicating a varying tendency of a plurality of the temporally consecutive RSS values, it is determined whether or not the alarm sound is output from the speaker 32.

As described above in the present invention, the moving average value av produced by merging each of the variations in the X-axis, Y-axis, Z-axes is employed. Therefore, a theft of each of the two-wheeled motor vehicles 3a, 3b can be determined even if the X-axis detector 41, the Y-axis detector 42 and the Z-axis detector 43, which are present in the sensor unit 38, are not matched to the longitudinal, lateral and vertical directions FR, LR and UD. Hence, without taking into account the detecting directions of the sensor unit 38 in relation to the two-wheeled motor vehicles 3a, 3b, the antitheft system 1 can be mounted on a desired place and thus the antitheft system 1 capable of being more easily mounted than was conventionally done can be provided with its detecting capability, necessary and sufficient to determine the occurrence of a theft, obtained.

(4) Other Embodiment

Figure 9:
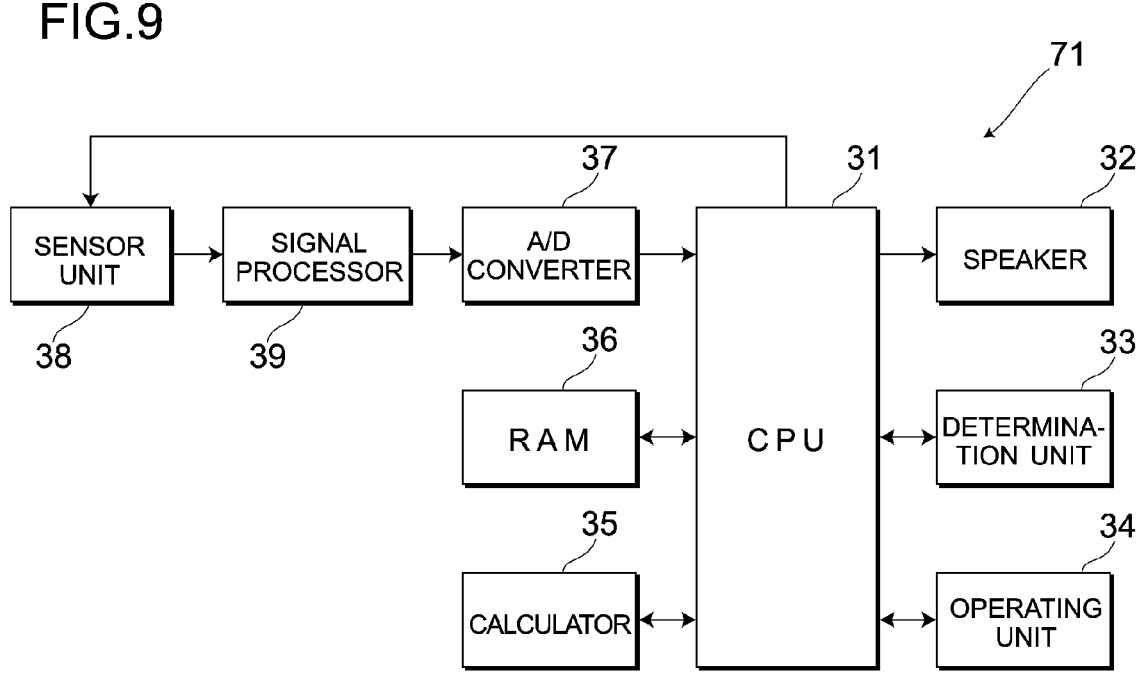
FIG. 9 is a block diagram illustrating a circuitry of an antitheft system according to another embodiment.

In addition, the present invention is not limited to the embodiment described above and various modifications are possible within the scope of the gist of the present invention. In FIG. 9 whose corresponding parts to those in FIG. 5 are labeled with the same numeral symbols as those in FIG. 5, numeral symbol 71 denotes an antitheft system according to another embodiment according to the present invention, which is different from the above embodiment in that an operational unit 34 is provided. In this case, a predetermined number in the step SP22 shown in FIG. 7 and the threshold in the step SP24 can be set as arbitrary numerical values by the operational unit 34.

In this case, by inputting a predetermined number of values for determining an adding number of consecutive RSS values r in calculating the moving average value av, the operational unit 34 acting as a settings changing unit varies a predetermined number set in the calculator 35 into an arbitrary number and then an averaging degree ranging from the last RRS value r to a plurality of the previously calculated consecutive RSS values r can be adjusted.

Further, by inputting a new threshold, the operational unit 34 varies a threshold set in the determination unit 33 into an arbitrary numerical value. A criterion for estimating the two-wheeled motor vehicles 3a, 3b to be in the conditions of the side-stand flow SS and center-stand flow CS can be regulated by varying a threshold.

In the system described above, in the antitheft system 71, a predetermined number of the RSS value r in calculating the moving average value av and the threshold acting as a criterion for determining the occurrence of a theft can be freely varied by means of the operational unit 34 and thus with reference to each condition, in the side-stand flow SS and the center-stand flow CS, assumed in the event of a theft of each of the two-wheeled motor vehicles 3a, 3b, the predetermined number in calculating the moving average value av and the threshold can be adjusted and furthermore an angle variation and vibrations of each of the two-wheeled motor vehicles 3a, 3b, generated in these conditions of the side-stand flow SS and center-stand flow CS are allowed to be easily detected, thus enabling a theft to be determined.

Furthermore, in yet another embodiment, a predetermined number has been set individually for an angle variation and vibrations of each of the two-wheeled motor vehicles 3a, 3b, generated in the conditions of the side-stand flow SS and center-stand flow CS, and then two moving average values av may be calculated by utilizing these two predetermined numbers.

In this case, in the determination unit 33, an angle threshold and a vibration threshold can be separately set depending on an angle variation generated in each of the conditions of the side-stand flow SS and center-stand flow CS in each of the two-wheeled motor vehicles 3a, 3b and on vibrations generated in a condition of the center-stand flow CS in the two-wheeled motor vehicle 3b.

Thus, in the antitheft systems 1, 71, when one of the moving average values av calculated to detect an angle variation generated in each of the two-wheeled motor vehicles 3a, 3b in each of the conditions of the side-stand flow SS and center-stand flow CS, respectively has become more than or equal to the angle threshold, the angle variations of the two-wheeled motor vehicles 3a, 3b are estimated to be generated in each of the conditions of the side-stand flow SS and center-stand flow CS, respectively, thus permitting an alarm sound to be output from the speaker 32.

Further, in the antitheft systems 1, 71, when the other moving average value av calculated to detect vibrations generated in the two-wheeled motor vehicle 3b in the condition of the center-stand flow CS has become more than or equal to the vibration threshold, the vibrations are estimated to be generated in the two-wheeled motor vehicle 3b in the condition of the center-stand flow CS, thus permitting an alarm sound to be output from the speaker 32.

Thus, in the antitheft systems 1, 71, the determination can be individually regulated as to whether or not an alarm sound is allowed to be output from the speaker 32 for the angle variations generated in the two-wheeled motor vehicles 3a, 3b and the vibrations generated in the two-wheeled motor vehicle 3b in the conditions of the center-stand flow CS. Thus, the sensitivity adjustment for the determination of a theft becomes possible.

Incidentally, a predetermined numbers which are separately set corresponding to the angle variations generated in the two-wheeled motor vehicles 3a, 3b in the conditions of the side-stand flow SS and center-stand flow CS and corresponding to the vibration generated in the two-wheeled motor vehicle 3b in the conditions of the center-stand flow CS may be allowed to be each varied into arbitrary numerical values by the operational unit 34. In this case, the two predetermined numbers in calculating the moving average value av, the angle threshold and the vibration threshold can be individually adjusted, permitting a theft to be determined in association with various situations.

Moreover, in the embodiment described above, the description was given to the case where the sensor unit 38 was applied which was separately provided with the X-axis detector 41, the Y-axis detector 42 and the Z-axis detector 43 corresponding to the X-axis, the Y-axis and the Z-axis, respectively which are perpendicular to one another. The present invention, however, is not limited to this case, and a sensor unit for detecting, by one sensor, accelerations in tri-axial directions composed of X, Y and Z axes may be applied. Further, as a sensor unit, various types of sensor units such as a piezoresistive sensor unit utilizing a piezoresistive effect, a piezoelectric sensor unit utilizing a piezoelectric effect (an electric charge generated on a surface of a piezoelectric element) or the like may be applied.

Furthermore, in the above embodiment, as an antitheft means, a speaker 32 is applied as a device for performing alarm by means of outputting an alarm sound. The present invention is not limited to this device and a wide variety of antitheft means including a communication unit for notifying a theft to a given management device by means of wireless communication, an electric power interrupter for interrupting electric power supplied from an electric source to terminals of the two-wheeled motor vehicles 3a, 3b, or the like may be applied.

Besides, in the above embodiment, the description was given of the case where the antitheft system is applied to each of the two-wheeled motor vehicles 3a, 3b with the side-stand and the center-stand, respectively. The present invention is not limited to this case and may be applied to a two-wheeled motor vehicle equipped with both a side-stand and a center-stand.

What is claimed is:

1. An antitheft system comprising:
    a sensor unit provided in a two-wheeled motor vehicle to detect variations of accelerations in a plurality of directions;
    a calculator for sequentially calculating a square-root of sum of squares of said variations of accelerations in a plurality of said directions in said sensor unit and then calculating a moving average thereof by calculating a sum of a predetermined number of the square-roots of sum of squares of said variations of accelerations obtained in chronological order, and then dividing the sum by the predetermined number; and
    a determination unit for determining whether or not an antitheft means should be allowed to operate based on said moving average and a threshold set in advance on the basis of conditions assumed to indicate the occurrence of a theft of said two-wheeled motor vehicle.

2. The antitheft system according to claim 1, wherein said sensor unit detects the variations of accelerations in said plurality of directions at preset time intervals.

3. The antitheft system according to claim 1, wherein said two-wheeled motor vehicle is equipped with at least one of a side-stand and a center-stand, and said determination unit is allowed to recognize, based on said threshold, an angle variation or vibrations of said two-wheeled motor vehicle, which are generated in the event of a theft.

4. The antitheft system according to claim 1, wherein the number of the square-roots of sum of squares used in calculating said moving average and threshold for the angle variation of the two-wheeled motor vehicle are set separately from those for the vibrations of said two-wheeled motor vehicle.

5. The antitheft system according to claim 1, further comprising a settings changing unit capable of changing at least one of said threshold and the number of the square-roots of sum of squares used in calculating said moving average value.

6. An antitheft method comprising:
    a detecting step for detecting variations of accelerations in a plurality of directions by means of a sensor unit provided in a two-wheeled motor vehicle;
    a calculating step for sequentially calculating a square-root of sum of squares of said variations of accelerations in a plurality of said directions in said sensor unit and then calculating a moving average thereof by calculating a sum of a predetermined number of the square-roots of sum of squares of said variations of accelerations obtained in chronological order, and then dividing the sum by the predetermined number; and
    a determination step for determining whether or not an antitheft means should be allowed to operate based on said moving average and a threshold set in advance on the basis of conditions assumed to indicate the occurrence of a theft of said two-wheeled motor vehicle.

7. The antitheft method according to claim 6, wherein said detecting step detects the variations of accelerations in said plurality of directions at preset time intervals.

8. The antitheft method according to claim 6, wherein said two-wheeled motor vehicle is equipped with at least one of a side-stand and a center-stand, and said determination step includes a recognition step for recognizing an angle variation or vibrations which are generated in the event of a theft in said two-wheeled motor vehicle.

9. The antitheft method according to claim 6, wherein the number of the square-roots of sum of squares used in calculating said moving average value and threshold for the angle variation of the two-wheeled motor vehicle are set separately from those for the vibrations of said two-wheeled motor vehicle.

10. The antitheft method according to claim 6, wherein said antitheft method includes a settings changing step for changing, by means of a settings changing unit, at least one of said threshold and the number of the square-roots of sum of squares used in calculating said moving average value.

* * * * *